United States Patent
Yu et al.

(10) Patent No.: US 11,084,526 B2
(45) Date of Patent: Aug. 10, 2021

(54) SYSTEM FOR PASSIVELY AND ACTIVELY MONITORING AND EVALUATING AN ELECTRIC POWER STEERING SYSTEM

(71) Applicant: GM Global Technology Operations LLC, Detroit, MI (US)

(72) Inventors: Bo Yu, Novi, MI (US); Ian Y. Hwa, West Bloomfield, MI (US); Adam J. Kloess, Walled Lake, MI (US); Yu Cao, Courtice (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 518 days.

(21) Appl. No.: 15/988,444

(22) Filed: May 24, 2018

(65) Prior Publication Data

US 2019/0359252 A1 Nov. 28, 2019

(51) Int. Cl.
| | |
|---|---|
| B62D 5/04 | (2006.01) |
| G06F 17/14 | (2006.01) |
| B62D 15/02 | (2006.01) |
| B62D 5/00 | (2006.01) |
| B62D 6/00 | (2006.01) |

(52) U.S. Cl.
CPC ......... *B62D 5/0481* (2013.01); *B62D 15/022* (2013.01); *G06F 17/142* (2013.01); *B62D 5/006* (2013.01); *B62D 5/0463* (2013.01); *B62D 6/008* (2013.01)

(58) Field of Classification Search
CPC ..... G06F 17/142; B62D 5/0481; B62D 6/008; B62D 6/06
See application file for complete search history.

(56) References Cited

U.S. PATENT DOCUMENTS

| | | | |
|---|---|---|---|
| 6,219,604 B1 | 4/2001 | Dilger et al. | |
| 2017/0080970 A1* | 3/2017 | Kezobo | ............. B62D 5/046 |
| 2018/0370563 A1* | 12/2018 | Schaenzel | ............. F16H 57/01 |
| 2020/0262415 A1* | 8/2020 | Schmidt | ............. H04L 12/40 |

FOREIGN PATENT DOCUMENTS

JP 2004161073 A 6/2004

OTHER PUBLICATIONS

U.S. Appl. No. 15/653,022, First Named Inventor: Coburn C. Bland III, "Method of Self-Diagnosis for Power Steering Assembly," filed on Jul. 18, 2017.

* cited by examiner

*Primary Examiner* — Christian Chace
*Assistant Examiner* — Katherine Marie Fitzharris (57) ABSTRACT

A system and method for passively and actively monitoring and determining the location of at least one mechanical anomaly for a power steering system of a vehicle is disclosed. The system includes one or more processors and a memory coupled to the processors. The memory stores a baseline waveform and data comprising program code that, when executed by the one or more processors, causes the system to receive at least one excitation signal and at least one response signal. The power steering system creates the response signal in response to receiving the excitation signal. In response to receiving the excitation signal and the response signal, the system is caused to estimate the frequency response between the excitation signal and the response signal based on a fast Fourier transform (FFT) algorithm. The frequency response is represented by an estimated waveform.

18 Claims, 7 Drawing Sheets

SYSTEM FOR PASSIVELY AND ACTIVELY MONITORING AND EVALUATING AN ELECTRIC POWER STEERING SYSTEM

INTRODUCTION

The present disclosure relates to a system and method for evaluating a power steering system, and more particularly towards a system and method for passively and actively monitoring and evaluating mechanical attributes of the power steering system.

Steering systems usually include a steering wheel connected to the front wheels of a vehicle, where a driver manipulates the steering wheel to control the direction of the vehicle's motion. Many vehicles are equipped with a power steering system to reduce the overall effort required to turn the steering wheel. One type of power steering system includes an electric motor for augmenting the mechanical force exerted by a driver upon the steering wheel, where the electric motor is coupled to a shaft along a steering axis or rack by a drive mechanism. Some types of power steering systems, such as steer-by-wire systems, establish steering control through electric motors that are controlled by algorithms stored in one or more electronic control units (ECUs).

Sometimes drivers may feel an abnormal vibration or sensation when gripping the steering wheel with their hands while operating the vehicle. The abnormal vibration may be caused by mechanical issues with the power steering system. However, sometimes the software used to control a steer-by-wire system may filter abnormal vibrations in steering rack as well as mask abnormal vibrations when transmitting torque feedback to the steering wheel. As a result, a driver may not become aware of a mechanical anomaly. Moreover, some autonomous vehicles may not include driver inputs such as a steering wheel. Accordingly, there is no opportunity for a driver to detect an abnormal vibration through the steering wheel while the vehicle is being operated.

Some evaluation systems presently exist for monitoring and evaluating steer-by-wire or autonomous systems, however these approaches may not be able to pinpoint the specific location or cause of a mechanical issue. Moreover, these evaluation systems may not be capable of passively monitoring the power steering system during normal operation of the vehicle.

Thus, while existing systems achieve their intended purpose, there is a need for a new and improved system and method for monitoring and evaluating a power steering system for detecting and diagnosing mechanical anomalies.

SUMMARY

According to several aspects, a system for passively and actively monitoring a power steering system of a vehicle is disclosed. The monitoring system includes one or more processors and a memory coupled to the processors. The memory stores a baseline waveform and data comprising program code that, when executed by the one or more processors, causes the system to receive at least one excitation signal and at least one response signal. The power steering system creates the response signal in response to receiving the excitation signal. In response to receiving the excitation signal and the response signal, the system is caused to estimate the frequency response between the excitation signal and the response signal based on a fast Fourier transform (FFT) algorithm. The frequency response is represented by an estimated waveform. In response to determining the frequency response between the excitation signal and the response signal, the system is caused to determine at least one profile characteristic of the estimated waveform. The system is also caused to determine a difference in value between at least one characteristic of the estimated waveform and a corresponding characteristic of the baseline waveform. In response to determining the difference in value between the at least one characteristic of the estimated waveform and the corresponding characteristic of the baseline waveform is greater than a threshold difference value, the system is caused to initiate a diagnostic procedure to evaluate a plurality of mechanical attributes of the power steering system.

In another approach, the processors are further caused to determine a coherence between the excitation signal and the response signal, and compare the coherence with a threshold coherence value, where the threshold coherence value represents a minimum correlation value. In response to determining the coherence is greater than the coherence threshold value, the processors are caused to determine the profile characteristic of the estimated waveform.

In yet another approach, the characteristic of the estimated waveform is a frequency profile representing a frequency of each peak and valley of the estimated waveform.

In still another approach, the characteristic of the estimated waveform is an amplitude profile representing an amplitude between each peak and valley of the estimated waveform.

In another approach, the characteristic of the estimated waveform is a number profile representing a number of peaks and valleys in the estimated waveform.

In yet another approach, the processors are further caused to generate a flag in response to determining the difference in value between the at least one characteristic of the estimated waveform and the corresponding characteristic of the baseline waveform is greater than a threshold difference value.

In one approach, the system further includes a steering motor and a steering wheel that are both in communication with the at least one processor. The processors initiate a frequency sweep of the steering motor by generating an input signal selected from the group consisting of a torque input signal, an angular position input signal, a current input signal, an angular velocity input signal, and a power input signal.

In yet another approach, the processors are further caused to confirm the steering wheel is free to rotate, and in response to determining that the steering wheel is free to rotate, generate the input signal. The steering motor is configured to generate an output torque in response to receiving the input signal.

In still another approach, the system further includes a torque sensor in communication with the processor, where the torque sensor is configured to monitor the output torque, and a rotary encoder in communication with the processor. The rotary encoder is configured to monitor an angular position of a shaft of the steering motor.

In another approach, the processors are configured to monitor the rotary encoder to determine the angular position of the steering motor shaft during the frequency sweep and determine a location of at least one mechanical anomaly based on the input signal and the angular position of the steering motor.

In yet another approach, a diagnostic system for determining a location of at least one mechanical anomaly in a power steering system of a vehicle is disclosed. The diagnostic system includes a steering motor including a shaft, a steering wheel, a torque sensor configured to monitor an output torque, a rotary encoder configured to monitor an angular position of the shaft of the steering motor, one or more processors in communication with the steering motor, the steering wheel, the torque sensor, and the rotary encoder, and a memory coupled to the one or more processors. The steering motor is configured to generate the output torque. The memory includes data including program code that, when executed by the one or more processors, causes the system to confirm the steering wheel is free to rotate, in response to receiving the trigger signal. In response to determining the steering wheel is free to rotate, the processors are caused to generate an input signal. The steering motor actively performs a frequency sweep in response to receiving the input signal. The processors are further caused to monitor the rotary encoder during the frequency sweep to determine the angular position of the steering motor shaft. The processors are also caused to determine the location of the at least one mechanical anomaly based on the input signal and the angular position of the steering motor.

In one approach, the trigger signal is generated on a periodic basis, before or after service of the vehicle, in response to an overspeed of the steering motor, or an overload of the steering motor.

In yet another approach, the processors are further configured to determine an estimated magnitude and an estimated phase based on the torque input signal and the angular position of the steering motor generated by the steering motor during the frequency sweep.

In still another approach, processors are further configured to determine a goodness of fit for the estimated magnitude and the estimated phase of the frequency response with respect to an expected magnitude and an expected phase of a model of the steering motor.

In another approach, the expected magnitude response and the expected phase response are based on a plurality of model parameters. The model parameters are determined based on a mass-spring-damper model of a mechanical connection between the steering wheel and the power steering system, and the steering motor is an emulator motor.

In yet another approach, the model parameters are determined by the following:

$$\frac{\text{Motor Position}(s)}{\text{Motor Torque}(s)} = \frac{J_w s^2 + bs + k}{(J_m s^2 + b_m s)(J_w s^2 + bs + k) + J_w s^2 (bs + k)}$$

where $J_m$ is motor inertia, $b_m$ is motor damping, $J_w$ is steering wheel inertia, k is a spring constant of connection, and b is a damping constant of connection.

In still another approach, in response to determining that the goodness of fit is less than or equal to a threshold fit, the processors are further configured to create a flag and generate a diagnostic summary.

In another approach, in response to determining the goodness of fit is greater than a threshold fit, the processors are caused to calculate a plurality of experimental parameters based on the input signal and the angular position of the steering wheel. The processors are further caused to compare values of each of the plurality of experimental parameters with a baseline value of the corresponding model parameters. In response to determining that a difference in value between one of the plurality of experimental parameters and the baseline value of the corresponding one of the model parameters falls within a range of predefined values, the processors are caused to create a diagnostic summary indicating the power steering system does not include mechanical anomalies.

In yet another approach, in response to determining that the difference in value between one of the plurality of experimental parameters and the baseline value of one of the corresponding one of the model parameters falls outside the range of predefined values, the processors are caused to determine the location of the at least one mechanical anomaly in the power steering system based on a specific parameter that does not fall within the range of predefined values. The processors are also caused to generate the diagnostic report identifying the location of the at least one mechanical anomaly found in the power steering system.

In one approach, a system for passively and actively monitoring a power steering system of a vehicle and determining a location of at least one mechanical anomaly of the power steering system is disclosed. The diagnostic system includes steering motor including a shaft, where the steering motor is configured to generate an output torque. The diagnostic system also includes a steering wheel, a torque sensor configured to monitor the output torque, a rotary encoder configured to monitor an angular position of the shaft of the steering motor, one or more processors in communication with the steering motor, the steering wheel, the torque sensor, and the rotary encoder, and a memory coupled to the processors. The memory stores a baseline waveform and data comprising program code that, when executed by the one or more processors, causes the diagnostic system to receive at least one excitation signal and at least one response signal. The power steering system creates the response signal in response to receiving the excitation signal. In response to receiving the excitation signal and the response signal, the processors are caused to estimate the frequency response between the excitation signal and the response signal based on an FFT algorithm. The frequency response is represented by an estimated waveform. In response to determining the frequency response between the excitation signal and the response signal, the processors are caused to determine at least one profile characteristic of the estimated waveform. The processors are caused to determine a difference in value between at least one characteristic of the estimated waveform and a corresponding characteristic of the baseline waveform. In response to determining the difference in value between the at least one characteristic of the estimated waveform and the corresponding characteristic of the baseline waveform is greater than a threshold difference value, the processors are caused to initiate a diagnostic procedure to evaluate a plurality of mechanical attributes of the power steering system by generating a flag. In response to receiving the trigger signal, the processors are caused to confirm the steering wheel is free to rotate. In response to determining the steering wheel is free to rotate, the processors are caused to generate a torque input signal, where the steering motor actively performs a frequency sweep in response to receiving the torque input signal. The processors are further caused to monitor the rotary encoder during the frequency sweep to determine the angular position of the steering motor shaft. Finally, the processors are caused to determine the location of the at least one mechanical anomaly based on the torque input signal and the angular position of the steering motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
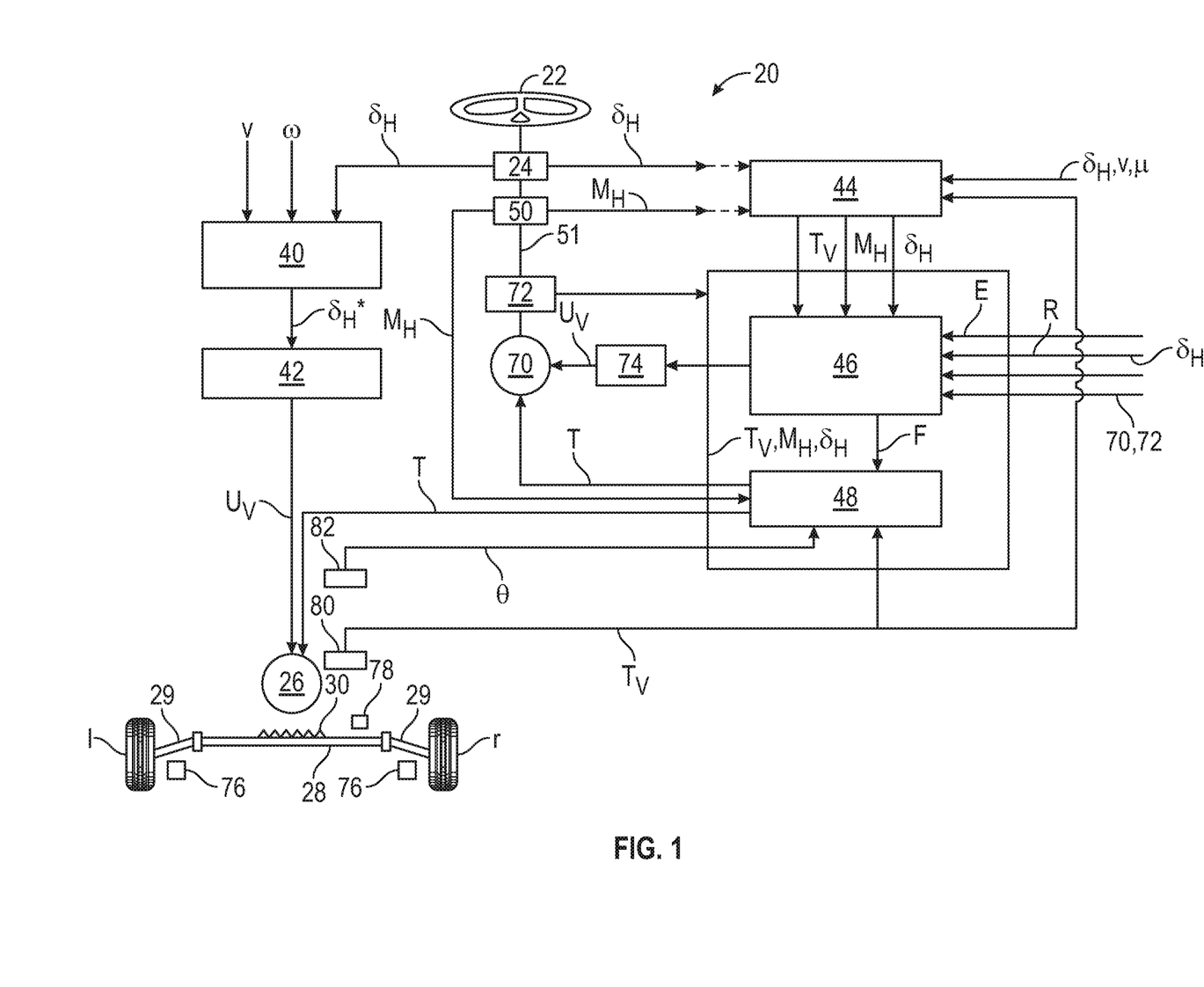
FIG. 1 is a schematic depiction of an exemplary power steering system for a vehicle, where mechanical attributes of the power steering system are monitored according to an exemplary embodiment.

FIG. 1 is a schematic depiction of an exemplary power steering system 20 that may be utilized in a vehicle (not shown). The vehicle may be any self-propelled wheeled conveyance such as, but not limited to, a car, truck, sport utility vehicle, van, motor home, motorcycle, unmanned ground vehicle, etc., without departing from the scope of the present disclosure. In some embodiments, the vehicle may be a semi-autonomous or a fully autonomous vehicle. A fully autonomous vehicle may be self-maneuvering and capable of and navigating in an environment without human input. The power steering system 20 of FIG. 1 includes a steering wheel 22, a steering wheel angle sensor 24, a steering motor 26, a rack 28, a steering gear 30, and a steering emulator motor 70 coupled to the steering wheel 22 by a gear 72.

The power steering system 20 shown in FIG. 1 is a steer-by-wire system having no mechanical connection between the steering wheel 22 and the road wheels r and l of the vehicle. However, it is to be appreciated that some steer-by-wire systems may include a mechanical connection between the steering wheel and the road wheel that may serve as a back-up device in case the steer-by-wire system is powered off or is not operating. Furthermore, although FIG. 1 illustrates a steer-by-wire system, the disclosure may be used in any type of electronic power steering (EPS) system that includes at least one electric motor. In other words, the disclosure is not limited to evaluating only steer-by-wire systems. For example, the power steering system 20 may be a standard EPS system such as a rack EPS system or a dual pinion EPS system. Moreover, although FIG. 1 illustrates the power steering system 20 having a steering wheel 22, it is to be appreciated that the disclosure may be used in autonomous vehicles that do not include manual inputs such as a steering wheel or pedals.

In the embodiment as shown in FIG. 1, the steering motor 26 is engaged with the rack 28 of the vehicle by the steering gear 30. The left wheel l and the right wheel r are connected to the rack 28 by a pair of respective tie rods 29. The steering motor 26 is controlled by an electric voltage provided by a steering regulator 42, which is described in greater detail below. More specifically, the steering regulator 42 provides a steering output voltage or signal $U_r$ that is used to control the steering motor 26. In the embodiment as shown, the steering motor is an electric motor or actuator for turning the wheels r and l of the vehicle. If the steering motor 26 is used in a standard EPS system having a mechanical connection between the steering wheel and the road wheels, then the steering motor 26 may provide an assist torque for augmenting the steering effort of the steering wheel 22.

FIG. 1 illustrates a single steering motor 26 for controlling the steering angle of both the left wheel l and the right wheel r. Although FIG. 1 illustrates the power steering system 20 having a single steering motor 26, it is to be appreciated that in another embodiment the power steering system 20 may include two steering motors. Specifically, one of the steering motors may be used to control the left wheel l and the remaining steering motor may be used to control the right wheel r. If the power steering system 20 includes two steering motors, then the wheels l, r may be controlled independently of one another. Furthermore, in the event two steering motors are used, the steering regulator 42 generates two unique steering output signals, where one of the signals is sent to the steering motor controlling the left wheel and the remaining signal is sent to the steering motor controlling the right wheel.

The power steering system 20 includes a first nominal value generator 40, a steering regulator 42, a second nominal value generator 44, a steering evaluator 46, and a diagnostic evaluator 48 that are implemented on one or more control modules. For example, the first nominal value generator 40, the steering regulator 42, the second nominal value generator 44, the steering evaluator 46, and the diagnostic evaluator 48 may be part of an electronic control unit (ECU) for the steering motor 26. The control module is a non-generalized, electronic control device having one or more pre-programmed digital computers or processors, memory or non-transitory computer readable medium coupled to one or more processors used to store data such as control logic, instructions, image data, lookup tables, etc., and a plurality of input/output peripherals or ports. The processor of the control module is configured to execute the control logic or instructions.

The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

One or more data structures may also reside in memory, and may be used by the processor, operating system, or application to store or manipulate data.

The nominal value generator 40 is in electronic communication with the steering wheel angle sensor 24 and the steering regulator 42. The nominal value generator 40 is also in electronic communication with one or more controllers or sensors (not shown) to receive values related to the dynamics of the vehicle such as, but not limited to, a vehicle speed v or a yaw velocity ω. A driver may steer the vehicle in a specific direction by turning the steering wheel 22 at a steering wheel angle $\delta_H$, and the steering wheel angle sensor 24 detects the steering wheel angle $\delta_H$. The power steering system 20 also includes a torque sensor 50 coupled to a steering column 51. In some steer-by-wire systems, the torque sensor 50 is optional and is configured to monitor a steering wheel torque $M_H$.

The steering wheel angle $\delta_H$ is received as input by the nominal value generator 40. The nominal value generator 40 is configured to modify the steering wheel angle $\delta_H$ based on the dynamic values of the vehicle (e.g., the vehicle speed v and the yaw velocity ω). Specifically, in one non-limiting embodiment the steering wheel angle $\delta_H$ is modified by the nominal value generator 40 into a nominal steering wheel angle $\delta_H^*$ based on a speed dependent function f(v), where $\delta_H^* = f(v) \times \delta_H$. The nominal steering wheel angle $\delta_H^*$ is then communicated to the steering regulator 42.

The steering regulator 42 is a positional regulator that ensures the wheel angle deflection of the front wheels r and l follow the nominal steering wheel angle $\delta_H^*$. In one embodiment, the steering regulator 42 may be based on proportional-integral-derivative control (PID control), however it is to be appreciated that other approaches may be used as well. In the event the front wheels of the vehicle are each controlled by separate steering motors, the steering regulator 42 controls the front wheels based on two separate control loops.

The power steering system 20 may include a regulator 74 configured to regulate the steering emulator motor 70. In some embodiments, the steering emulator motor 70 and the regulator 74 operate as a feedback actuator for providing feedback to the steering wheel 22. As seen in FIG. 1, no mechanical connection exists between the steering wheel 22 and the road wheels l and r. Thus, due to the lack of a mechanical connection between the steering wheel 22 and the road wheels l, r during normal operation of steer-by-wire system, no mechanical path exists to transfer road wheel torque (e.g., aligning torque) to the steering wheel 22. Instead, as explained in greater detail below, the steering emulator motor 70 and the regulator 74 operate as the feedback actuator to emulate the torque that is conveyed to the steering wheel 22.

The second nominal value generator 44 is in communication with a torque sensor 80 that is positioned on the steering motor 26. The torque sensor 80 is configured to monitor an output torque $T_V$ generated by the steering motor 26 and sends the output torque $T_V$ to the regulator 74. In an embodiment, the output torque $T_V$ may be an estimated value based on current signals. The second nominal value generator 44 calculates a nominal value manual torque $M_H$ based on the output torque $T_V$ and other motor signals such as, for example, motor velocity and motor position (not shown in FIG. 1). Alternatively, in another embodiment the second nominal value generator 44 may determine the output torque $T_V$ based on other operating parameters such as, for example, the steering wheel angle $\delta_H$, the vehicle speed V, and a coefficient of friction µ between the road surface and tires.

The second nominal value generator 44 functionally interacts with the regulator 74. Specifically, the second nominal value generator 44 shares the output torque $T_V$, the steering wheel torque $M_H$, and the steering wheel angle $\delta_H$ with the regulator 74. The regulator 74 calculates a control signal $U_H$ based on the output torque $T_V$, the steering wheel torque $M_H$, and the steering wheel angle $\delta_H$ with the steering evaluator 46. The control signal $U_H$ is sent to the steering emulator motor 70. The control signal $U_H$ is configured to control operation of the steering emulator motor 70.

The steering evaluator 46 is configured to monitor the power steering system 20 and detect the presence of a mechanical issue or anomaly within the power steering system 20. The diagnostic evaluator 48 is configured to determine the source or location of the mechanical anomaly based on executing a failure mode algorithm. In one embodiment, the diagnostic evaluator 48 executes the failure mode algorithm independently with respect to the algorithms executed by the steering evaluator 46 and is explained in greater detail below. That is, the diagnostic evaluator 48 may operate independently from the steering evaluator 46 in some embodiments.

The diagnostic evaluator 48 is in communication with the steering wheel angle sensor 24, the steering motor 26, the steering evaluator 46, the torque sensor 50, the steering emulator motor 70, the torque sensor 80, and a rotary encoder 82. A steer-by-wire system may have two motors, where one is used to control the steering wheel (e.g., the steering emulator motor 70 controls the steering wheel 22) and the remaining motor controls the steering rack and road wheels (e.g., the steering motor 26 controls the rack 28 and the road wheels l and r). The rotary encoder 82 is configured to monitor an angular position Θ of a shaft (not illustrated in FIG. 1) of the steering motor 26. As explained in greater detail below, the diagnostic evaluator 48 initiates a diagnostic procedure by sending a torque input signal T to the steering motor 26 or the steering emulator motor 70. In response to receiving the torque input signal T, the steering motor 26 or the steering emulator motor 70 actively performs a frequency sweep. As also explained below, the data collected during the frequency sweep may be used to determine the location or cause of a mechanical anomaly in the power steering system 20. It is to be appreciated that the frequency sweep may be performed by either the steering motor 26 or the steering emulator motor 70.

The torque input signal T may be, but is not limited to, a white noise signal, a multi-sine signal, a step signal, a pulse signal, or a chirp signal. In one embodiment, the white noise may contain frequencies ranging from about 1 to about 200 Hertz in equal amounts. The multi-sine wave is a periodic signal that is composed of a harmonically related sum of sinusoid components. The chirp signal may also be referred to as a sweep signal. The chirp signal may increase (up-chirp) or decrease (down-chirp) in frequency over time. The frequency of the output torque $T_V$ generated by the steering motor 26 is varied while performing a frequency sweep. Specifically, the frequency of the torque input signal T varies while the amplitude may be kept at a constant value. The amplitude of the torque input signal T represents magnitude.

The steering evaluator 46 may now be described in greater detail. Specifically, the steering evaluator 46 monitors an input and at least one output of the power steering system 20 passively during operation. It is to be appreciated that the vehicle may be operated in a variety of ways and is not limited to a driver manipulating the vehicle by the steering wheel 22. In one embodiment, operation may include fully autonomous control of the vehicle. In yet another embodiment, operation may include an evaluation where the vehicle is operated in a testing environment. The input is an excitation signal E. In response to receiving the excitation signal E as input, the power steering system 20 generates the output, which is at least one response signal R. The excitation signal may be a harmonic signal such as, but not limited to, a sine wave having a predetermined amplitude and frequency. In the alternative, the excitation signal may be random. For example, the excitation signal may be harmonic when the power steering system 20 is tested in a facility where the input is simulated. In another embodiment, the excitation signal may be random when the vehicle is being driven along a bumpy road or other uneven surface. Some examples of uneven surfaces include, for example, roads including Belgian blocks or a rough road course.

It is to be appreciated that the excitation signal E and the response signal R are both monitored passively. In other words, the excitation signal E and the response signal R are generated without any additional or active control of the power steering system 20. As explained below, the steering evaluator 46 compares the estimated frequency response with a baseline frequency response of the power steering system 20 and determines the presence of one or more mechanical anomalies with the power steering system 20 based on the comparison. That is, the estimated frequency response of the excitation signal E to the resultant signal R is representative of one or more mechanical attributes of the power steering system 20. For example, the mechanical attribute in FIGS. 2A, 2B, 3A, and 3B represents fastener tightness for a pinch bolt at an I-shaft to gear shaft interface (not shown in FIG. 1) of the power steering system 20.

The steering evaluator 46 compares a waveform of the estimated frequency response with a waveform of the baseline frequency response and determines the presence of one or more mechanical anomalies based on the comparison between the two waveforms. The baseline frequency response may be stored in the memory of one of the control modules within the vehicle. Alternatively, the baseline frequency response may be stored in a remote location and is communicated to the vehicle via a wireless communication signal. The baseline frequency response may be determined empirically based on test results during normal operation (i.e., no issues exist), and the estimated frequency response is based on the present operating conditions of the vehicle.

In the exemplary embodiment as described below, the excitation signal E is tie rod force and the resultant signals R include the steering wheel angle $\delta_H$ and an axial position of the rack 28 within a rack housing (not illustrated in FIG. 1) of the power steering system 20. In the embodiment as shown, the steering evaluator 46 is in electronic communication with a plurality of tie rod force sensors 76 where each tie rod force sensor 76 monitors a corresponding one of the tie rods 29. More specifically, one of the tie rod force sensors 76 monitors the left tie rod 29 and the other tie rod force sensor 76 monitors the right tie rod 29. Although FIG. 1 illustrates tie rod force sensors 76, in another embodiment the tie rod force may be a calculated value based on other sensor readings.

Figure 2A:
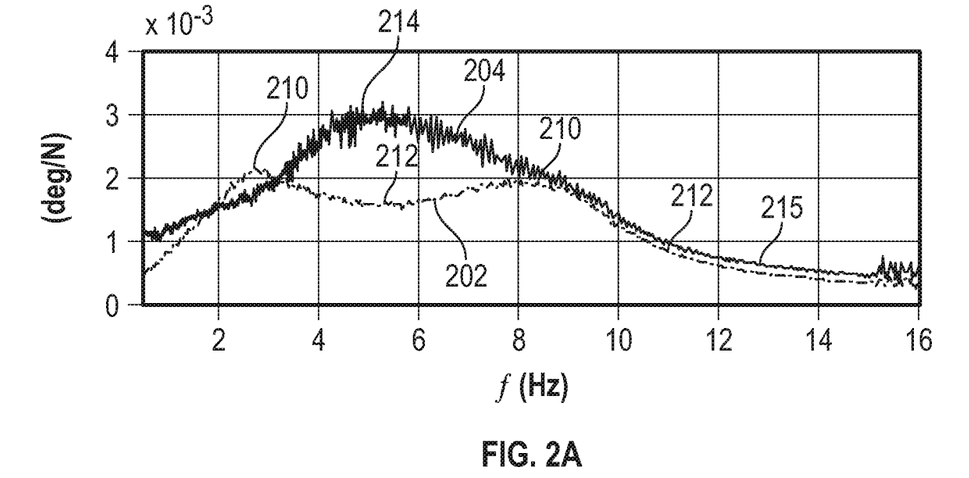
FIG. 2A is a graph of a Bode plot illustrating an exemplary magnitude response of the power steering system in FIG. 1 based on a tie rod force and a steering wheel angle according to an exemplary embodiment.
Figure 2B:
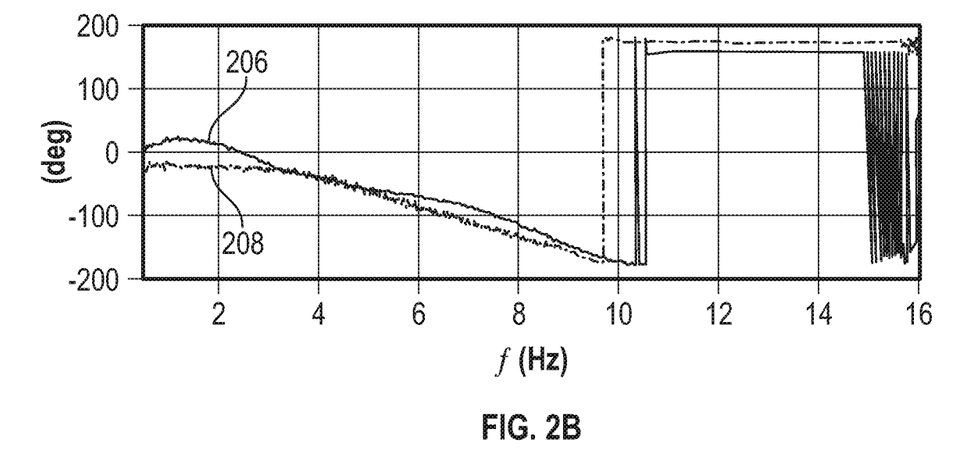
FIG. 2B is a graph of a Bode plot illustrating an exemplary phase response of the power steering system in FIG. 1 based on the tie rod force and the steering wheel angle according to an exemplary embodiment.

As seen in FIG. 2A, two waveforms representing a magnitude response of the tie rod force to the steering wheel angle $\delta_H$ are shown. The two waveforms are generated when mechanical connections are engaged between the roads wheels and the steering wheel. Specifically, FIG. 2A includes a baseline waveform 202 representing the baseline magnitude response of the tie rod force to the steering wheel angle $\delta_H$ and an estimated waveform 204 representing the estimated magnitude response of the of the tie rod force to the steering wheel angle $\delta_H$. FIG. 2B illustrates a baseline waveform 206 representing the baseline phase response of the tie rod force to the steering wheel angle $\delta_H$ and an estimated waveform 208 representing the estimated phase response of the of the tie rod force to the steering wheel angle. As seen in FIGS. 2A and 2B, each waveform defines a unique profile.

Figure 3A:
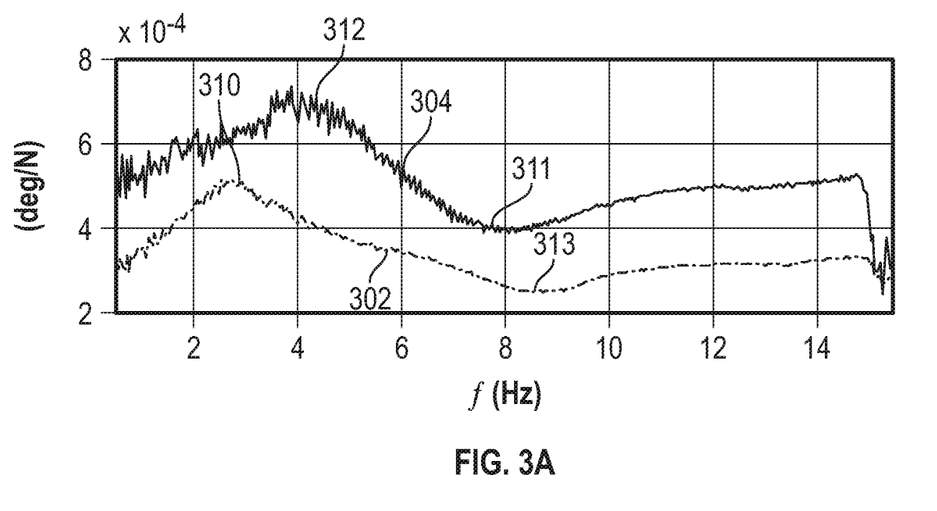
FIG. 3A is a graph of a Bode plot illustrating an exemplary magnitude response of the power steering system in FIG. 1 based on the tie rod force and a rack position according to an exemplary embodiment.
Figure 3B:
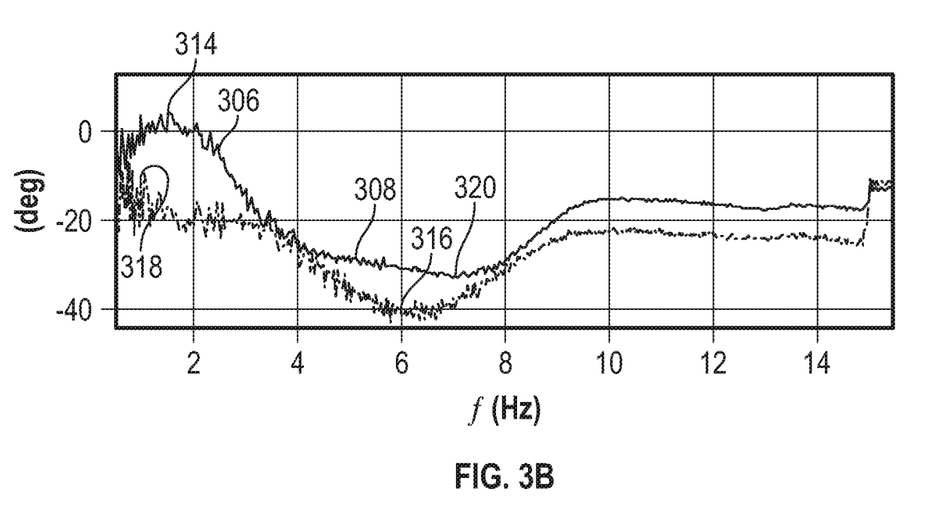
FIG. 3B is a graph of a Bode plot illustrating an exemplary phase response of the power steering system in FIG. 1 based on the tie rod force and the rack position according to an exemplary embodiment.

In the embodiment as shown in FIGS. 3A and 3B, a magnitude response and a phase response of a tie rod force to the axial position of the rack 28 (FIG. 1) are shown respectively. Specifically, FIG. 3A includes a waveform representing the baseline magnitude response and a waveform representing the estimated magnitude response, and FIG. 3B includes a waveform representing the baseline phase response and a waveform representing the estimated phase response. It is to be appreciated that while the embodiments as described disclose an excitation signal E and a response signal R for determining a loose fastener, other excitation signals and response signals may be used to determine other mechanical anomalies as well. Some other examples of excitation signals and resultant signals include, but are not limited to, the position of the rack 28 as input and a position of the steering motor 26 as output. The combination of the rack position and the steering motor position may be used to evaluate a connection between the rack 28 and a shaft (not shown) of the steering motor 26. In the event the power steering system 20 is a belt-drive rack EPS, then an inadequate connection between the rack 28 and the shaft may be caused by a worn or loose belt.

Turning back to FIG. 1, the steering evaluator 46 is in electronic communication with the tie rod force sensors 76, the steering wheel angle sensor 24, and a rack position sensor 78. As mentioned above, instead of including the tie rod force sensors 76 the tie rod force may be a calculated value. The rack position sensor 78 is configured to detect an axial position of the rack 28 within a rack housing (not shown). The steering evaluator 46 monitors the excitation signal E and the response signal R during an evaluation to determine the frequency response. The evaluation may be triggered or initiated by any number of events. For example, the evaluation may be initiated at start up (i.e., at engine start-up) or, alternatively, the evaluation may be initiated in response to determining the vehicle is being driven along a specific length of test track. That is, the steering evaluator 46 may determine that the vehicle is being driven along a test track that includes a profile that simulates a specific operating condition, environment, or operating event.

In the example as described, the steering evaluator 46 monitors the steering wheel angle δH, the tie rod force signal, and the axial position of the rack 28 while the evaluation is executed. The tie rod force signal is the excitation signal E and the steering wheel angle and/or the axial position of the rack 28 are the response signal R. The steering evaluator 46 then estimates a frequency response between the tie rod force and the steering wheel angle δH, the tie rod force and the axial position of the rack 28, or both. In other words, the steering evaluator 46 estimates the magnitude and phase response between the excitation signal E and the response signal R. The steering evaluator 46 estimates the frequency response between the excitation signal E and the response signal R based on a fast Fourier transform (FFT) algorithm. One example of an FFT algorithm is the Goertzel algorithm, however it is to be appreciated that the disclosure may use other types of algorithms as well.

Referring to both FIGS. 2A and 2B, both the magnitude response and the phase response include two distinct waveforms. The magnitude response in FIG. 2A includes the baseline waveform 202 representing the baseline magnitude response and the estimated waveform 204 representing the estimated magnitude response. The phase response in FIG. 2B includes the baseline waveform 206 representing the baseline phase response and an estimated waveform 208 representing the estimated phase response. As explained in greater detail below, the steering evaluator 46 compares the baseline frequency response with the estimated frequency response to determine the presence of a mechanical anomaly with the power steering system 20 (FIG. 1). A process flow diagram shown in FIG. 4 describes a method 400 for detecting the mechanical anomaly and is also described in greater detail below.

FIGS. 3A and 3B illustrate the estimated magnitude response and the phase response of the tie rod force to the axial position of the rack 28. FIG. 3A includes a baseline waveform 302 representing the baseline magnitude response and an estimated waveform 304 representing the estimated magnitude response. FIG. 3B includes a baseline waveform 306 of the baseline phase response and an estimated waveform 308 represents the estimated magnitude response.

Referring now to FIGS. 1, 2A, 2B, 3A, and 3B, once the magnitude and phase responses are determined, the steering evaluator 46 then compares the excitation signal E and the response signal R to determine a coherence between the two signals. The coherence is used to estimate the causality between an input and output of a system and is expressed as a value between 0 and 1. A value of 0 would indicate the excitation signal E and the response signal R are completely unrelated to one another, where the value of the coherence increases with respect to the relationship between the excitation signal E and the response signal R. The steering evaluator 46 then compares the coherence with a threshold coherence value. The threshold coherence value represents a minimum correlation value between the two signals. For example, in one embodiment the threshold correlation value is 0.95. However, the correlation value may vary based on the specific requirements of the power steering system 20.

In response to determining the coherence is greater than the coherence threshold value, the steering evaluator 46 then determines at least one profile characteristic of the estimated frequency response. The profile characteristic represents a change in output of the power steering system 20 in response to a mechanical anomaly. Specifically, the profile characteristic reflects a change between the baseline frequency response and the estimated frequency response of the power steering system 20, where the change in the frequency response is created in response to a mechanical anomaly in the power steering system 20. For example, in the embodiment as shown in FIGS. 2A, 2B, 3A, and 3B the mechanical anomaly is fastener tightness and the mechanical attribute is the pinch bolt at the I-shaft to gear shaft interface of the power steering system 20.

In one embodiment, the profile characteristics include, but are not limited to, a frequency profile, an amplitude profile, and a number profile. The frequency profile represents the frequency of each peak and valley of a waveform representing the frequency response, the amplitude profile represents an amplitude between each peak and valley of a waveform representing the frequency response, and a number profile represents the number of peaks and valleys in a waveform representing the frequency response. For example, the waveform 202 in FIG. 2A includes two peaks 210 and two valley 212. In contrast, the estimated waveform 204 includes a single peak 214 and a single valley 215. Similarly, the baseline waveform 302 in FIG. 3A includes a single peak 310 and a single valley 311 and the waveform 304 also includes a single peak 312 and a single valley 313. The waveform 306 in FIG. 3B includes a single peak 314 and a single valley 316 and the waveform 308 also includes a single peak 318 and a single valley 320.

The profile characteristics between the estimated waveform and the baseline waveform are compared to one another. Specifically, the steering evaluator 46 compares the frequency profile, the amplitude profile, and the number profile of the estimated waveform with the corresponding profiles of the baseline waveform and may generate a flag F based on the comparison. Specifically, as explained below, the steering evaluator 46 may generate a flag F indicating the presence of at least one mechanical anomaly in the power steering system 20.

Turning back to FIG. 1, in one embodiment the steering evaluator 46 compares the number profile of the estimated waveform with the baseline waveform. In response to determining that the number of peaks and the number of valleys of the estimated waveform is unequal to the number of peaks and valleys of the baseline waveform, the steering evaluator 46 generates a flag, and a diagnostic procedure is performed. For example, in the embodiment as shown in FIG. 2A, the baseline waveform 202 includes two peaks 210 and two valleys 212. In contrast, the estimated waveform 204 includes a single peak 214 and a single valley 215. Since the number of peaks and the number of valleys between the two waveforms 202 and 204 are unequal to one another, the steering evaluator 46 generates a flag.

Referring to FIGS. 1 and 3A, in another example the mechanical anomaly may be detected based on the frequency value. For example, in the embodiment as shown in FIG. 3A the peak 310 of the baseline waveform 302 is about 3 Hertz and the peak 312 of the estimated waveform 304 is about 4 Hertz. Therefore, if the threshold difference value is less than 0.5 Hertz the steering evaluator 46 generates a flag. In yet another example, the mechanical anomaly may be detected based on the amplitude profile. For example, the peak 310 of the baseline wavelength 302 includes an amplitude of about $5 \times 10^{-3}$ degrees/Newton while the peak 312 of the estimated waveform 304 includes an amplitude of about $7 \times 10^{-3}$ degrees/Newton. Thus, if the threshold difference value is less than $2 \times 10^{-3}$ degrees/Newton the steering evaluator 46 generates a flag.

Figure 4:
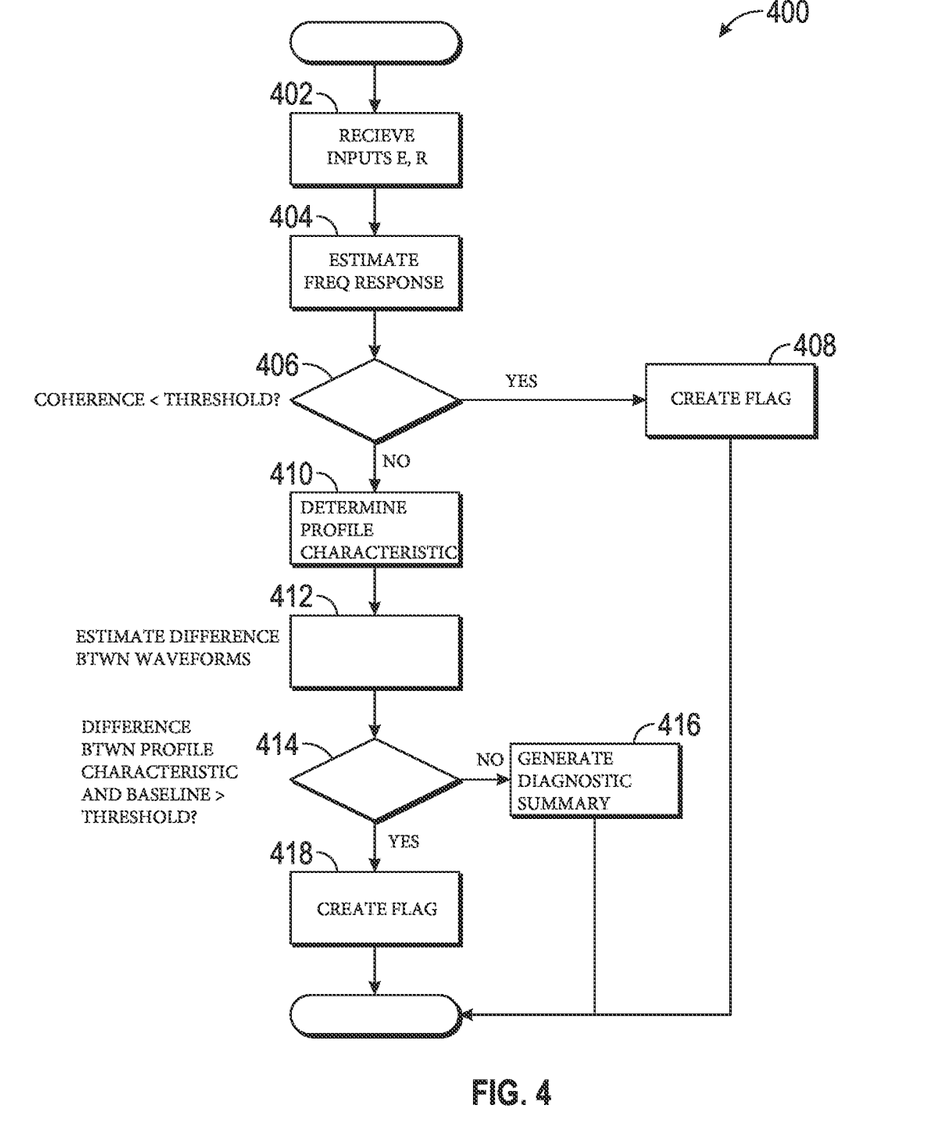
FIG. 4 is a process flow diagram for determining the presence of one or more mechanical anomalies in the power steering system shown in FIG. 1 according to an exemplary embodiment.

FIG. 4 illustrates the method 400 for passively monitoring the power steering system 20 to determine the presence of one or more mechanical anomalies in the power steering system 20. Referring now to FIGS. 1-4, the method 400 for passively monitoring the power steering system 20 to determine the presence of a mechanical anomaly is described. The method 400 may start at block 402. In block 402, the steering evaluator 46 receives as input the excitation signal E and the response signal R. The method may then proceed to block 404.

In block 404, in response to receiving the excitation signal E and the response signal R the steering evaluator 46 estimates the frequency response between the excitation signal E and the response signal R based on an FFT algorithm, where the frequency response is represented by an estimated waveform. Specifically, the frequency response of the estimated waveform includes a magnitude response (seen in FIGS. 2A and 3A) and a phase response (seen in FIGS. 2B and 3B). The method 400 may then proceed to block 406.

In block 406, the steering evaluator 46 compares the coherence between the excitation signal E and the response signal R with the threshold coherence value. In response to determining the coherence is less than the threshold coherence value, the method 400 then proceeds to block 408. In block 408, the steering evaluator 46 creates a flag indicting that the coherence value between the excitation signal E and the response signal R is too low. The steering evaluator 46 may then generate a diagnostic summary that is sent to a database, one or more vehicle systems, or is communicated directly to the driver. The method 400 may then terminate.

In response to determining the coherence is greater than the coherence threshold value, the method 400 may then proceed to block 410. In block 410, the steering evaluator 46 determines at least one profile characteristic of the estimated waveform. For example, in one embodiment the profile characteristics for the estimated waveform includes at least one of the frequency profile, the amplitude profile, and the number profile. The method 400 may then proceed to block 412.

In block 412, the steering evaluator 46 estimates a difference in value between at least one characteristic of the estimated waveform and a corresponding characteristic of the baseline waveform. More specifically, in one embodiment the steering evaluator 46 estimates the difference in value between the estimated waveform and the baseline waveform with respect to the frequency profile, the amplitude profile, and the number profile. For example, in the embodiment as shown in FIG. 3A the steering evaluator 46 compares the peak 310 of the baseline waveform 302, which is about 3 Hertz, with the peak 312 of the estimated waveform 304, which is about 4 Hertz. The method 400 may then proceed to block 414.

In block 414, the steering evaluator 46 determines if the difference in value between the profile characteristics of the estimated waveform and the corresponding characteristics of the baseline waveform is greater than the threshold difference value. In response to determining that the difference in value between the estimated waveform and the baseline waveform is less than or equal to the threshold difference value, then the method 400 may proceed to block 416. In block 416, the steering evaluator 46 generates a diagnostic summary indicating no mechanical anomalies were detected in the power steering system 20. The method 400 may then terminate.

In response to determining the difference in value between the estimated waveform and the baseline waveform is greater than the threshold difference value, the method may then proceed to block 418. In block 418, the steering evaluator 46 generates one or more flags F that may be sent to a database, one or more vehicle systems, or is communicated to a driver. The flags F indicate the presence of mechanical anomalies. The method may then terminate.

In response to receiving the flag F, the diagnostic evaluator 48 executes a diagnostic procedure to evaluate a plurality of mechanical attributes of the power steering system 20. The diagnostic procedure is explained in the process flow diagrams in FIGS. 5 and 6. Turning back to FIG. 1, the diagnostic procedure for identifying mechanical attributes of individual components in the power steering system 20 is now described. As mentioned above, in one embodiment the steering evaluator 46 generates a flag F to initiate the diagnostic procedure. Specifically, the steering evaluator 46 generates a flag F in response to determining the difference in value between one of the profile characteristics of the estimated waveform and a corresponding characteristic of the baseline waveform is greater than a threshold difference value. Although a flag is described, it is to be appreciated that the diagnostic procedure may be initiated based on other situations as well. More specifically, the steering evaluator 46 may initiate a diagnostic procedure periodically (i.e., weekly, monthly, bi-annually, etc.), before or after serving of the vehicle, at specific mileages of the vehicle (i.e., at every 5,000 miles or about 8,046 kilometers), or in response to detecting an overspeed or overload of the steering motor 26 or the steering emulator motor 70. An overspeed of a motor indicates the rotational speed of the motor shaft has exceeded operational speed limits, and an overload of the motor indicates the motor torque has exceeded operational force limits.

The diagnostic procedure starts when the diagnostic evaluator 48 receives as input a trigger signal. In one embodiment, the trigger signal is the flag F generated by the steering evaluator 46. Alternatively, as mentioned above, the trigger signal is generated by the vehicle on a periodic basis, before or after service of the vehicle, or in response to determining an overspeed or overload of the steering motor 26 or the steering emulator motor 70. In response to receiving the trigger signal the diagnostic evaluator 48 initiates the motor evaluation by generating the torque input signal T. The torque input signal T indicates the motor torque is generated by the steering motor 26 or the steering emulator motor 70 for the duration of the evaluation. In one embodiment, the duration of the evaluation is about thirty seconds, however it is to be appreciated that the evaluation may be longer or shorter in time as well.

Figure 5:
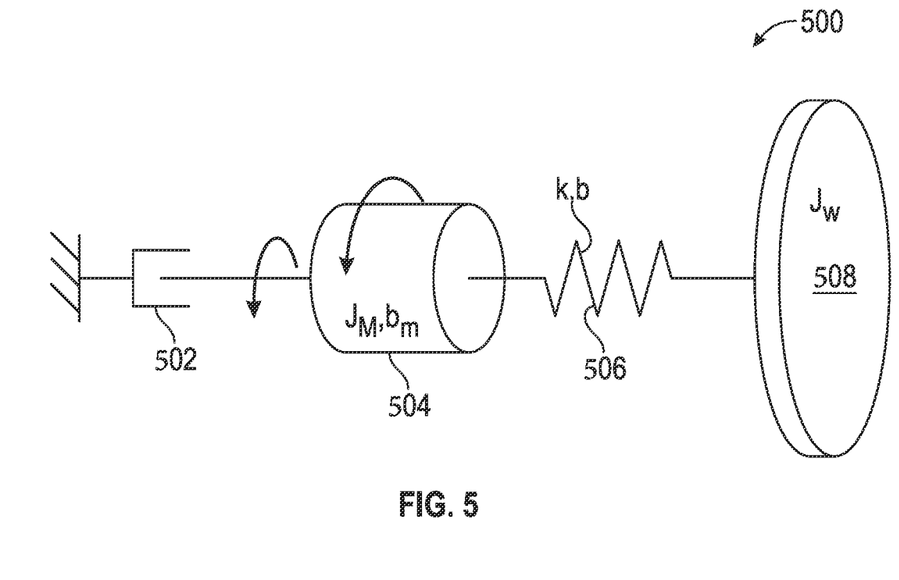
FIG. 5 is a schematic diagram illustrating a mass-spring-damper model of a motor and steering wheel of the power steering system according to an exemplary embodiment.
Figure 6:
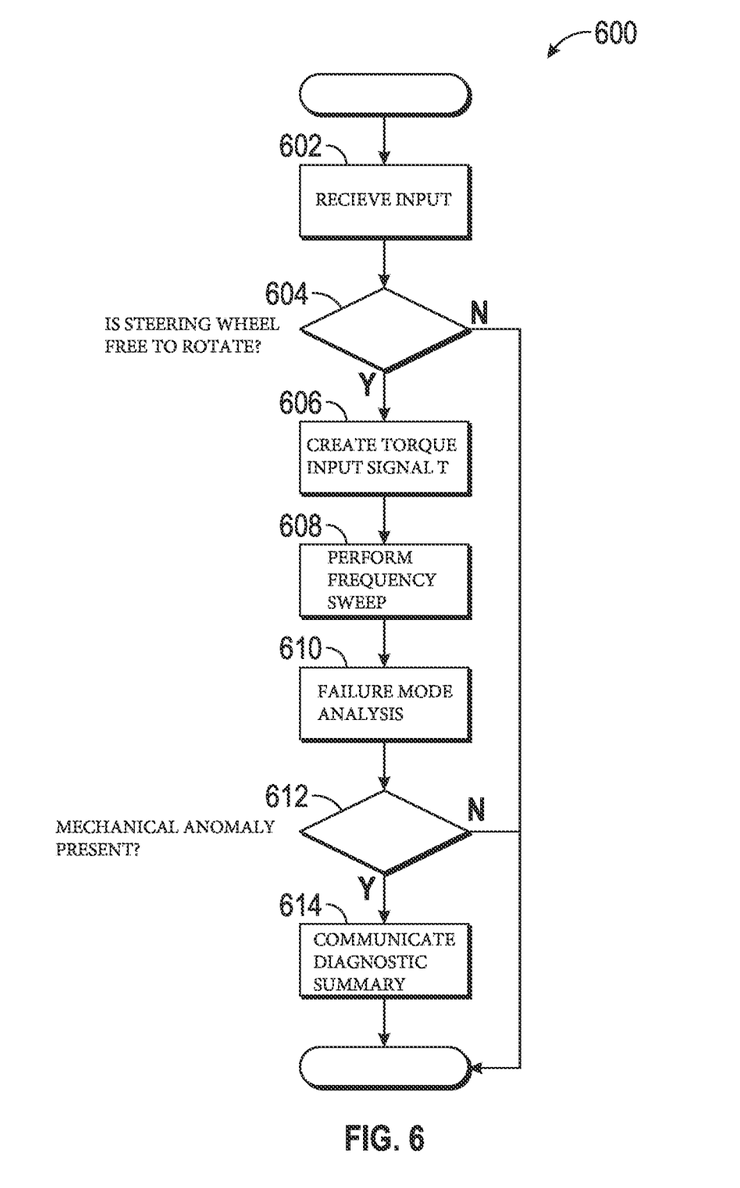
FIG. 6 is a process flow diagram for performing a diagnostic procedure to evaluate the power steering system according to an exemplary embodiment.

A diagnostic procedure is described in greater detail below and is illustrated in FIGS. 5 and 6. The diagnostic procedure illustrated in FIG. 6 illustrates the diagnostics of the mechanical components located between the steering emulator motor 70 and the road wheels l, r as seen in FIG. 1. However, it is to be appreciated that the diagnostic procedure may be applied to the steering motor 26 and the road wheels l, r as well. Turning back to FIG. 1, in response to receiving the torque input signal T, the steering emulator motor 70 generates the output torque TV. Specifically, the frequency of the input (i.e., the torque input signal T) is varied as the diagnostic evaluator 48 monitors the torque sensor 50 and the steering wheel angle sensor 24 to determine the output torque TV and the steering wheel angle δH. The steering wheel 22 is free to rotate during the motor evaluation of the steering wheel angle δH. That is, while the motor evaluation is executed a driver is not holding or manipulating the steering wheel 22 (i.e., the driver's hands are off the steering wheel 22). During the motor evaluation the steering wheel angle δH ranges from 10 to 30 degrees. Although specific input and output signals are described, it is to be appreciated that other input and output signals may also be used for diagnostics such as, but not limited to, the steering wheel angle δH as input and the output torque TV as output.

The diagnostic evaluator 48 may record the data either discreetly or continuously. The input is the torque input T and the output is the steering wheel angle $δ_H$. The diagnostic evaluator then estimates the frequency response of the power steering system 20, which is represented by a Bode plot of the estimated magnitude and the estimated phase of the frequency determined. It is to be appreciated that the passive method of the steering evaluator 46 differs from the method executed by the diagnostic evaluator 48 based on an active diagnostics approach. An active approach may involve directly controlling the torque or position of a steering motor, or indirectly controlling the torque or position of the steering motor by torque and angle overlay functions.

Once the magnitude and phase of the frequency response are determined, the diagnostic evaluator 48 determines a goodness of fit for the estimated magnitude and phase of the frequency response with respect to an expected magnitude and phase of a mass-spring-damper model 500, which is illustrated in FIG. 5. Referring to both FIGS. 1 and 5, the model 500 includes a damper 502, a motor 504, a biasing element such as a spring 506, and a steering wheel 508, where the spring 506 represents the connection between the steering emulator motor 70 and the steering wheel 22 (FIG. 1). The plurality of model parameters are based on the components included in the mass-spring-damper model shown in FIG. 5. The plurality of model parameters include, but are not limited to, motor inertia Jm, motor damping bm, steering wheel inertia Jw, a spring constant of connection k, and a damping constant of connection b.

The mass-spring-damper model 500 in FIG. 5 has a plurality of model parameters. Equation 1, which is shown below, expresses a calculated transfer function that is determined based on the predetermined values of the motor variables.

$$\frac{\text{Motor Position}(s)}{\text{Motor Torque}(s)} = \frac{J_w s^2 + bs + k}{(J_m s^2 + b_m s)(J_w s^2 + bs + k) + J_w s^2 (bs + k)} \quad \text{Equation 1}$$

The values for the parameters in model 500 may be calculated to maximize a goodness of fit to the estimated magnitude and phase. Some system identification toolboxes such as, but not limited to, MATLAB (matrix laboratory) may be used to facilitate the calculation of the plurality of model parameters illustrated in the model 500. Although MATLAB is described, it is to be appreciated that other methods to determine the values of parameters of model 500 may be used as well.

It is to be appreciated that the mass-spring-damper model shown in FIG. 5 is based on the steering emulator motor 70 of the steer-by-wire system shown in FIG. 1. Therefore, the plurality of model parameters may be different based on the type of power steering system 20. For example, an autonomous vehicle that has no steering wheel would omit the steering wheel inertia Jw and even the steering emulator motor 70. Also, the plurality of model parameters may be different for a road wheel control system that is part of a steer-by-wire system (i.e., the system from the steering motor 26 to the road wheels l and r shown in FIG. 1).

Goodness of fit is a degree of confidence to which an observed set of data may be represented by a model with corresponding parameter values. In the embodiment as described, the observed set of data is the estimated magnitude and the estimated phase of the frequency response determined by the diagnostic evaluator 48. The diagnostic evaluator 48 compares the goodness of fit between the estimated magnitude and phase with the model parameters of the model 500 to a threshold fit. In response to determining that the goodness of fit is less than or equal to the threshold fit, the diagnostic evaluator 48 creates a flag indicating the correlation between the observed data (i.e., the estimated magnitude and phase) and the model 500 is not sufficient. However, if the goodness of fit is greater than the threshold fit, then the diagnostic evaluator 48 may then determine the location of the mechanical anomaly in the power steering system 20.

A plurality of baseline values of the model 500 are calculated during normal operation of the power steering system 20 (i.e., there are no issues with the system), and are stored in memory of the diagnostic evaluator 48. That is, a baseline value is determined for each model parameter (i.e., the steering wheel inertia Jw, etc.). The diagnostic evaluator 48 then compares a value of an experimental parameter with a corresponding baseline value of one of the model parameters. In response to determining a difference in values between one of the experimental parameters and a corresponding one of the baseline values does not fit within a range of predefined values, the diagnostic evaluator 48 then determines the location of a mechanical anomaly in the power steering system 20, which is explained below. The experimental values are determined based on experimental data. Specifically, the experimental data is collected in response to the diagnostic evaluator 48 receiving a trigger signal. The experimental data that is collected may include, but is not limited to, the torque input signal T to the steering emulator motor 70 and the steering wheel angle $\delta_H$.

The location of the mechanical anomaly in the power steering system 20 is determined based on the specific parameter that does not fall within the range of predefined values. For example, in the embodiment as shown in FIG. 5 if the motor damping $b_m$ does not fall within the range of predefined values, then sometimes a value that is higher than the predefined range of values may indicate corrosion due to water intrusion into the steering emulator motor 70, and a value that is lower than the range of predefined values may indicate a loose connection between the steering emulator motor 70 and column. If the steering wheel inertia $J_w$ does not fall within the range of predefined values, then a value that is higher than the predefined ranges of values indicates that an object may be obstructing or is attached the steering wheel 22. If the value of the steering wheel inertia $J_w$ is less than the range of predefined values, then one reason for a low value may be the absence of the driver's front airbag. If the value of the spring constant of connection k or the damping constant of connection b does not fall within the predefined range of values, then a value that is higher than the range of predefined values may indicate a column bearing failure. It is to be appreciated that these examples are not an exhaustive list of all the mechanical anomalies that may be detected by the disclosure.

FIG. 6 is an exemplary process flow diagram illustrating a method 600 for performing a diagnostic procedure to determine the location of a mechanical anomaly in the power steering system 20. Referring generally to FIGS. 1 and 6, the method 600 may begin at block 602. In block 602, the diagnostic evaluator 48 receives as input a trigger signal. In one embodiment, the trigger signal is the flag F generated by the steering evaluator 46. Alternatively, the trigger signal may be generated periodically, before or after service of the vehicle, or in response to determining an overspeed or overload of the steering motor 26 or steering emulator motor 70. The method 600 may then proceed to block 604.

In block 604, the diagnostic evaluator 48 confirms that the steering wheel 22 is free to rotate. In other words, the steering evaluator 46 determines if a driver is grasping and manipulating the steering wheel 22. It is to be appreciated that block 604 may be omitted if the power steering system 20 does not include a steering wheel 22. In response to determining that the steering wheel 22 is not free to rotate, the method 600 may terminate. In response to determining that the steering wheel 22 is free to rotate, the method 600 proceeds to block 606.

In block 606, the diagnostic evaluator 48 generates the torque input signal T. The method 600 may then proceed to block 608.

In block 608, in response to receiving the torque input signal T the steering motor 26 or steering emulator motor 70 performs the frequency sweep. The method 600 may then proceed to block 610.

In block 610, the steering evaluator 46 determines the location of one or more mechanical anomalies by executing a failure mode analysis. The failure mode analysis is described in greater detail in FIG. 7. The failure mode analysis results in a diagnostic summary. The method 600 may then proceed to block 612.

In block 612, the diagnostic evaluator 48 determines if the diagnostic summary indicates one or more mechanical anomalies with the power steering system 20. If no anomaly is present in the diagnostic summary, then the method 600 may terminate. However, if at least one anomaly is detected, then the method 600 may proceed to block 614.

In block 614, the diagnostic summary is then communicated to other on-board vehicle systems. In addition to or in the alternative, the diagnostic summary is communicated to one or more systems that are located remotely from the vehicle (via a wireless connection). In one embodiment, the diagnostic summary may also be communicated to the driver using a device such as, for example, an in-vehicle display. The method 600 may then terminate.

Figure 7:
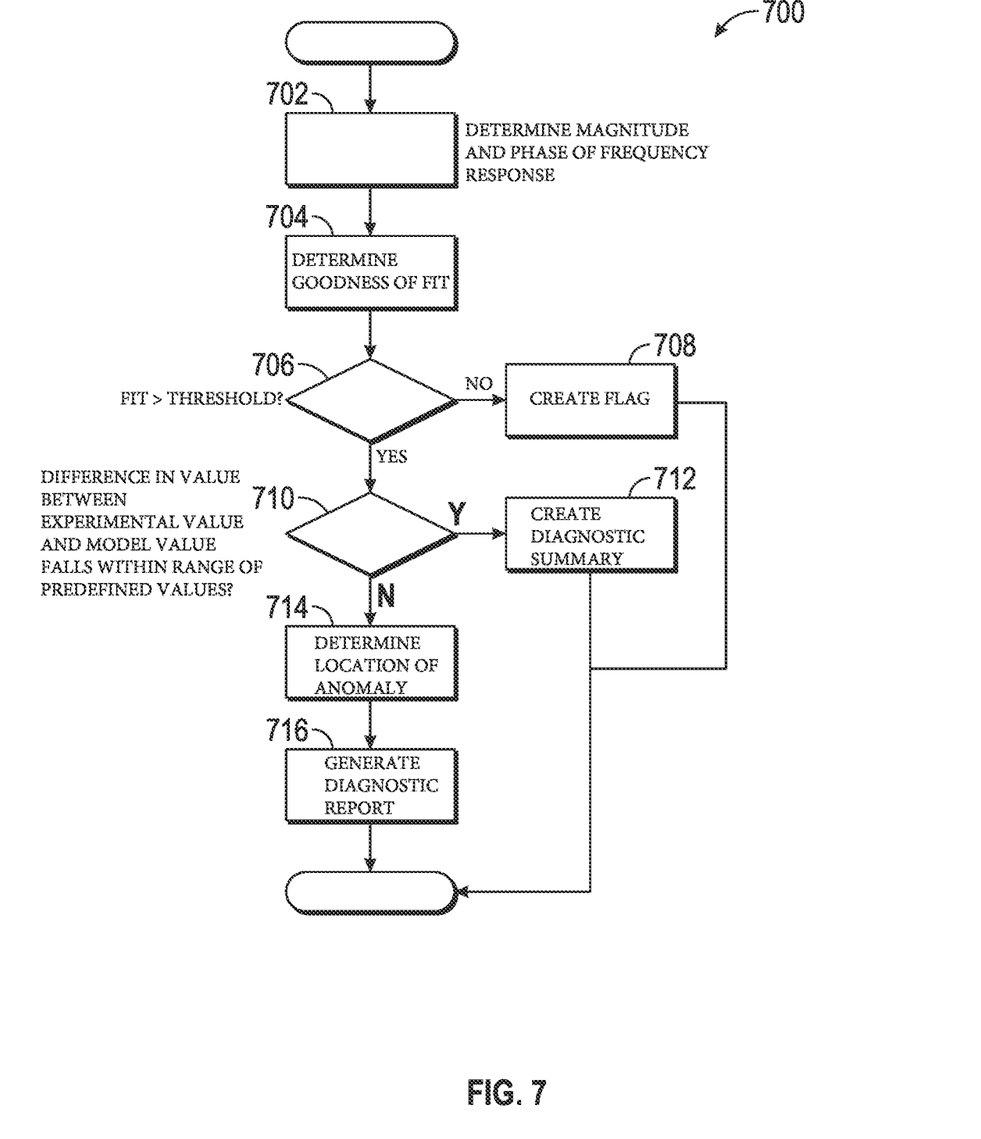
FIG. 7 is a process flow diagram for performing a failure mode analysis to determine the source of a mechanical anomaly in the power steering system according to an exemplary embodiment.

FIG. 7 is a process flow diagram illustrating a method 700 for executing a failure mode analysis to determine the location or source of one or more mechanical anomalies in the power steering system 20. Referring generally to FIGS. 1, 5, and 7, the method 700 may begin at block 702. In block 702, the diagnostic evaluator 48 determines the estimated magnitude and the estimated phase of the frequency response based on the torque input to steering emulator motor 70 and the steering wheel angle $\delta_H$ during the frequency sweep. The method 700 may then proceed to block 704.

In block 704, the diagnostic evaluator 48 determines the goodness of fit for estimated magnitude and phase of the frequency response with respect to an expected magnitude and phase of the model 500 of the power steering system 20. Together with the goodness of fit, the diagnostic evaluator 48 calculates the plurality of experimental parameter values based on the estimated frequency response between the torque input to steering emulator motor 70 and the steering wheel angle $\delta_H$. In the non-limiting embodiment as described, the plurality of experimental parameters include the motor inertia $J_m$, motor damping $b_m$, steering wheel inertia $J_w$, a spring constant of connection k, and the damping constant of connection b. The method may then proceed to block 706.

In block 706, the diagnostic evaluator 48 determines if the goodness of fit between the estimated and expected magnitude and phase are less than or equal to the threshold fit. In response to determining that the goodness of fit is less than or equal to the threshold fit, the method proceeds to block 708. In block 708, the diagnostic evaluator 48 creates a flag indicating the correlation between the observed data (i.e., the estimated magnitude and phase) and the expected values is not sufficient. The diagnostic summary is then created, and the method may then terminate.

If the goodness of fit is greater than the threshold fit, then the method may proceed to block 710. In block 710, the diagnostic evaluator 48 compares the value of each experimental parameter with a baseline value of one of the corresponding model parameters. In response to determining that the difference in value between the one of the experimental parameters and a corresponding one of the model parameters falls within the range of predefined values, the method 700 proceeds to block 712. In block 712 the diagnostic evaluator 48 creates a diagnostic summary that indicates no mechanical anomalies were found. The method 700 may then terminate.

In response to determining a difference in value between the one of the experimental parameters and a baseline value of a corresponding one of the model parameters falls outside of the range of predefined values, the method 700 may proceed to block 714. In block 714 the diagnostic evaluator 48 determines the location of at least one mechanical anomaly in the power steering system 20 based on the specific parameter that does not fall within the range of predefined values. The method may then proceed to block 716.

In block 716, the steering evaluator 46 generates a diagnostic report identifying the location of the mechanical anomalies found in the power steering system 20. The method may then terminate.

Referring generally to the figures, the disclosure provides an approach for passively and actively monitoring the power steering system 20 to determine the presence of a mechanical anomaly. The disclosure also provides an approach to identify the location of the mechanical anomaly as well. Since some types of power steering systems may not allow for a driver to feel abnormal vibrations in the steering wheel caused by a mechanical issue, the disclosure provides an alternative approach to check the mechanical integrity of the power steering system. Some existing system may be able to detect mechanical anomalies in a power steering system. However, these existing systems may not be able to determine the specific location of the anomaly. Moreover, existing systems may be unable to passively monitor the power steering system during normal operation of a vehicle. In contrast, the disclosed system may be able to monitor and identify the location of a mechanical issue in the power steering system during normal vehicle operation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for passively and actively monitoring a power steering system of a vehicle, the system comprising:
   one or more processors;
   a memory coupled to the one or more processors, the memory storing a baseline waveform and data comprising program code that, when executed by the one or more processors, causes the system to:
   receive at least one excitation signal;
   receive at least one response signal, wherein the power steering system creates the response signal in response to receiving the excitation signal;
   in response to receiving the excitation signal and the response signal, estimate a frequency response between the excitation signal and the response signal based on a fast Fourier transform (FFT) algorithm, wherein the frequency response is represented by an estimated waveform;

in response to determining the frequency response between the excitation signal and the response signal, determine at least one profile characteristic of the estimated waveform;

determine a difference in value between at least one characteristic of the estimated waveform and a corresponding characteristic of the baseline waveform;

in response to determining the difference in value between the at least one characteristic of the estimated waveform and the corresponding characteristic of the baseline waveform is greater than a threshold difference value, initiate a diagnostic procedure to evaluate a plurality of mechanical attributes of the power steering system;

determine a coherence between the excitation signal and the response signal;

compare the coherence with a threshold coherence value, wherein the threshold coherence value represents a minimum correlation value; and in response to determining the coherence is greater than the coherence threshold value, determine the at least one profile characteristic of the estimated waveform; and a steering motor and a steering wheel that are both in communication with the one or more processors, wherein the one or more processors initiate a frequency sweep of the steering motor by generating an input signal selected from a group consisting of a torque input signal, an angular position input signal, a current input signal, an angular velocity input signal, and a power input signal.

2. The system of claim 1, wherein the at least one characteristic of the estimated waveform is a frequency profile representing a frequency of each peak and valley of the estimated waveform.

3. The system of claim 1, wherein the at least one characteristic of the estimated waveform is an amplitude profile representing an amplitude between each peak and valley of the estimated waveform.

4. The system of claim 1, wherein the at least one characteristic of the estimated waveform is a number profile representing a number of peaks and valleys in the estimated waveform.

5. The system of claim 1, wherein the one or more processors are further caused to:

generate a flag in response to determining the difference in value between the at least one characteristic of the estimated waveform and the corresponding characteristic of the baseline waveform is greater than a threshold difference value.

6. The system of claim 1, wherein the one or more processors are further caused to:

confirm the steering wheel is free to rotate; and in response to determining that the steering wheel is free to rotate, generate the input signal, wherein the steering motor is configured to generate an output torque in response to receiving the input signal.

7. The system of claim 6, further comprising:

a torque sensor in communication with the one or more processors, wherein the torque sensor is configured to monitor the output torque; and a rotary encoder in communication with the one or more processors, wherein the rotary encoder is configured to monitor an angular position of a shaft of the steering motor.

8. The system of claim 7, wherein the one or more processors are configured to:

monitor the torque sensor and the rotary encoder to determine the output torque and the angular position of the steering motor shaft during the frequency sweep; and determine a location of at least one mechanical anomaly based on the input signal and the angular position of the steering motor.

9. A diagnostic system for determining a location of at least one mechanical anomaly in a power steering system of a vehicle, the diagnostic system comprising:

a steering motor including a shaft, the steering motor configured to generate an output torque;

a steering wheel;

a torque sensor configured to monitor the output torque;

a rotary encoder configured to monitor an angular position of the shaft of the steering motor;

one or more processors in communication with the steering motor, the steering wheel, the torque sensor, and the rotary encoder; and a memory coupled to the one or more processors, the memory storing data comprising program code that, when executed by the one or more processors, causes the diagnostic system to:

in response to receiving a trigger signal, confirm the steering wheel is free to rotate;

in response to determining the steering wheel is free to rotate, generate an input signal, wherein the steering motor actively performs a frequency sweep in response to receiving the input signal;

monitor the rotary encoder during the frequency sweep to determine the angular position of the steering motor shaft; and determine the location of the at least one mechanical anomaly based on the input signal and the angular position of the steering motor.

10. The diagnostic system of claim 9, wherein the trigger signal is generated on a periodic basis, before or after service of the vehicle, in response to an overspeed of the steering motor, or an overload of the steering motor.

11. The diagnostic system of claim 9, wherein the one or more processors are further configured to:

determine an estimated magnitude and an estimated phase based on the output torque and the angular position of the steering motor generated by the steering motor during the frequency sweep.

12. The diagnostic system of claim 11, wherein the one or more processors are further configured to:

determine a goodness of fit for the estimated magnitude and the estimated phase of a frequency response with respect to an expected magnitude and an expected phase of a model of the steering motor.

13. The diagnostic system of claim 12, wherein an expected magnitude response and an expected phase response are based on a plurality of model parameters, and wherein the plurality of model parameters are determined based on a mass-spring-damper model of a mechanical connection between the steering wheel and the power steering system, and wherein the steering motor is an emulator motor.

14. The diagnostic system of claim 13, wherein the plurality of model parameters are determined by the following:

$$\frac{\text{Motor Position}(s)}{\text{Motor Torque }(s)} = \frac{J_w s^2 + bs + k}{(J_m s^2 + b_m s)(J_w s^2 + bs + k) + J_w s^2 (bs + k)}$$

wherein $J_m$ is motor inertia, $b_m$ is motor damping, $J_w$ is steering wheel inertia, k is a spring constant of connection, and b is a damping constant of connection.

15. The diagnostic system of claim 12, wherein the one or more processors are further configured to:
    in response to determining that the goodness of fit is less than or equal to a threshold fit, create a flag and generate a diagnostic summary.

16. The diagnostic system of claim 12, wherein the one or more processors are further configured to:
    in response to determining the goodness of fit is greater than a threshold fit, calculate a plurality of experimental parameters based on the input signal and the angular position of the steering wheel;
    compare values of each of the plurality of experimental parameters with a baseline value of the corresponding model parameters; and
    in response to determining that a difference in value between one of the plurality of experimental parameters and the baseline value of the corresponding one of the model parameters falls within a range of predefined values, create a diagnostic summary indicating the power steering system does not include mechanical anomalies.

17. The diagnostic system of claim 16, wherein the one or more processors are further configured to:
    in response to determining that the difference in value between one of the plurality of experimental parameters and the baseline value of one of the corresponding one of the model parameters falls outside the range of predefined values, determine the location of the at least one mechanical anomaly in the power steering system based on a specific parameter that does not fall within the range of predefined values; and
    generate the diagnostic report identifying the location of the at least one mechanical anomaly found in the power steering system.

18. A system for passively and actively monitoring a power steering system of a vehicle and determining a location of at least one mechanical anomaly of the power steering system, the system comprising:
    steering motor including a shaft, the steering motor configured to generate an output torque;
    a steering wheel;
    a torque sensor configured to monitor the output torque;
    a rotary encoder configured to monitor an angular position of the shaft of the steering motor;
    one or more processors in communication with the steering motor, the steering wheel, the torque sensor, and the rotary encoder; and
    a memory coupled to the one or more processors, the memory storing a baseline waveform and data comprising program code that, when executed by the one or more processors, causes the system to:
    receive at least one excitation signal;
    receive at least one response signal, wherein the power steering system creates the response signal in response to receiving the excitation signal;
    in response to receiving the excitation signal and the response signal, estimate a frequency response between the excitation signal and the response signal based on a fast Fourier transform (FFT) algorithm, wherein the frequency response is represented by an estimated waveform;
    in response to determining the frequency response between the excitation signal and the response signal, determine at least one profile characteristic of the estimated waveform;
    determine a difference in value between at least one characteristic of the estimated waveform and a corresponding characteristic of the baseline waveform;
    in response to determining the difference in value between the at least one characteristic of the estimated waveform and the corresponding characteristic of the baseline waveform is greater than a threshold difference value, initiate a diagnostic procedure to evaluate a plurality of mechanical attributes of the power steering system by generating a flag;
    in response to receiving a trigger signal, confirm the steering wheel is free to rotate;
    in response to determining the steering wheel is free to rotate, generate a torque input signal, wherein the steering motor actively performs a frequency sweep in response to receiving the torque input signal;
    monitor the rotary encoder during the frequency sweep to determine the angular position of the steering motor shaft; and
    determine the location of the at least one mechanical anomaly based on the torque input signal and the angular position of the steering motor.

* * * * *